US011592827B1

(12) United States Patent
Lam et al.

(10) Patent No.: US 11,592,827 B1
(45) Date of Patent: Feb. 28, 2023

(54) PREDICTING YIELDING LIKELIHOOD FOR AN AGENT

(71) Applicant: Waymo LLC, Mountain View, CA (US)

(72) Inventors: Chi Pang Lam, San Mateo, CA (US); Stephane Ross, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 566 days.

(21) Appl. No.: 16/719,609

(22) Filed: Dec. 18, 2019

(51) Int. Cl.
*G05D 1/02* (2020.01)
*G06N 20/00* (2019.01)
*B60W 30/095* (2012.01)
*G06K 9/62* (2022.01)

(52) U.S. Cl.
CPC ....... *G05D 1/0221* (2013.01); *B60W 30/0956* (2013.01); *G05D 1/0289* (2013.01); *G06K 9/6257* (2013.01); *G06N 20/00* (2019.01)

(58) Field of Classification Search
CPC .... G05D 1/0221; G05D 1/0289; G06N 20/00; B60W 30/0956; G06K 9/6257
See application file for complete search history.

(56) References Cited

U.S. PATENT DOCUMENTS

| | | | | |
|---|---|---|---|---|
| 10,235,882 | B1* | 3/2019 | Aoude | G08G 1/163 |
| 10,739,777 | B2* | 8/2020 | Refaat | G06V 20/54 |
| 2010/0256852 | A1* | 10/2010 | Mudalige | G08G 1/164 |
| | | | | 701/24 |
| 2011/0190972 | A1* | 8/2011 | Timmons | G01C 21/34 |
| | | | | 701/31.4 |
| 2017/0090480 | A1* | 3/2017 | Ho | G05D 1/0027 |
| 2017/0277192 | A1* | 9/2017 | Gupta | B60W 30/20 |
| 2018/0194349 | A1* | 7/2018 | McGill, Jr. | B60W 30/10 |
| 2018/0326982 | A1* | 11/2018 | Paris | B60W 30/18154 |
| 2020/0159215 | A1* | 5/2020 | Ding | G05D 1/0221 |

(Continued)

OTHER PUBLICATIONS

Menendez-Romero et al., "Courtesy Behavior for Highly Automated Vehicles on Highway Interchanges," 2018 IEEE Intelligent Vehicles Symposium (IV), retrieved from URL <http://ais.informatik.uni-freiburg.de/publications/papers/menendez18iv.pdf>, Jun. 2018, 6 pages.

(Continued)

*Primary Examiner* — Ramsey Refai
(74) *Attorney, Agent, or Firm* — Fish & Richardson P.C.

(57) ABSTRACT

Methods, systems, and apparatus, including computer programs encoded on a computer storage medium, for predicting how likely it is that a target agent in an environment will yield to another agent when the pair of agents are predicted to have overlapping future paths. In one aspect, a method comprises obtaining a first trajectory prediction specifying a predicted future path for a target agent in an environment; obtaining a second trajectory prediction specifying a predicted future path for another agent in the environment; determining that, at an overlapping region, the predicted future path for the target agent overlaps with the predicted future path for the other agent; and in response: providing as input to a machine learning model respective features for the target agent and the other agent; and obtaining the likelihood score as output from the machine learning model.

22 Claims, 4 Drawing Sheets

(56) References Cited

U.S. PATENT DOCUMENTS

2021/0133582 A1\* 5/2021 Refaat .................... G06N 3/084

OTHER PUBLICATIONS

Ward et al., "Multi-classification of Driver Intentions in Yielding Scenarios," 2015 IEEE 18th International Conference on Intelligent Transportation Systems, retrieved from URL <https://www.diva-portal.org/smash/get/diva2:911785/FULLTEXT01.pdf>, Sep. 2015, 678-685.

\* cited by examiner

ENVIRONMENT 406A

ENVIRONMENT 406B

PREDICTING YIELDING LIKELIHOOD FOR AN AGENT

BACKGROUND

This specification relates to autonomous vehicles.

Autonomous vehicles include self-driving cars, boats, and aircraft. Autonomous vehicles use a variety of on-board sensors and computer systems to detect nearby objects and use such detections to make control and navigation decisions.

SUMMARY

This specification describes a system implemented as computer programs on-board a vehicle that can predict how likely it is that a target agent in an environment will yield to another agent when the pair of agents are predicted to have overlapping future paths. The target agent can be any agent in the environment, including the vehicle itself. The other agent can be any agent in the environment that is different from the target agent.

In general, one innovative aspect of the subject matter described in this specification can be embodied in methods that include the actions of obtaining a first trajectory prediction specifying a predicted future path for a target agent in an environment; obtaining a second trajectory prediction specifying a predicted future path for another agent in the environment; determining that, at an overlapping region, the predicted future path for the target agent overlaps with the predicted future path for the other agent; and in response: providing as input to a machine learning model respective features for the target agent and the other agent, wherein the machine learning model is configured to predict a likelihood score that the target agent will yield to the other agent when entering the overlapping region if both the target agent and the other agent follow respective predicted future paths; and obtaining the likelihood score as output from the machine learning model.

In some implementations, the method further includes: after obtaining a plurality of outputs each specifying a respective likelihood score that the target agent will yield to a corresponding other agent: identifying, from the plurality of other agents and based at least on the respective likelihood scores, one or more other agents that the target agent is yielding to.

In some implementations, the environment is in a vicinity of an autonomous vehicle; the target agent is the autonomous vehicle or an agent that is different from the autonomous vehicle in the environment; and the other agent is an agent that is different from the target agent in the environment.

In some implementations, the method further includes: if the likelihood score is greater than a predetermined threshold value: modifying the first trajectory prediction for the target agent in the environment to account for the target agent yielding to the other agent.

In some implementations, the respective features for the target agent include (i) features that describe the target agent and (ii) features that describe the predicted future path for the target agent.

In some implementations, the respective features for the other agent include (i) features that describe the other agent from a perspective of the target agent and (ii) features that describe the predicted future path for the other agent from the perspective of the target agent.

In some implementations, the respective features for the target agent and the other agent include pairwise features that describe interactions between the target agent and the other agent.

In some implementations, the method further includes: providing as input to the machine learning model respective features for the target agent and a different agent in the environment, the different agent having predicted future path that overlaps with the predicted future path of the target agent, and wherein the respective features comprise pairwise features that describe interactions between the target agent and the different agent.

In some implementations, the machine learning model is a gradient boosting decision forest model.

Particular embodiments of the subject matter described in this specification can be implemented so as to realize one or more of the following advantages. In order for a planning subsystem of a vehicle to generate planning decisions which cause the vehicle to travel along a safe and comfortable trajectory, the planning subsystem must be provided with timely and accurate prediction data which characterizes respective predicted future trajectories for agents in an environment in a vicinity of the vehicle. The agents may be, for example, pedestrians, bicyclists, motorcyclists, or other vehicles. In various scenarios, especially where multiple agents are present in the environment, one or more pairs of agents may be predicted to travel along future paths that overlap at an overlapping region. In other words, a predicted future path of an agent in the pair overlaps with a predicted future path of another agent in the same pair. In these scenarios, knowing which agent will enter the overlapping region prior to other agents enables the planning subsystem to generate proper and timely planning decisions.

The on-board system described in this specification can use a yielding prediction model to determine, for each pair of agents having overlapping predicted future paths, the likelihoods that a target agent in the pair will yield to the other agent in the pair. In particular, the yielding prediction model is configured to process, for each pair of agents having overlapping predicted future paths, a plurality of corresponding input features to generate an output which specifies the predicted likelihood.

Training such yielding prediction models is usually problematic for several reasons. The first is that training data can be noisy and inhibits successful training if obtained directly from either real or simulated driving logs. The second is that selecting appropriate features to input to the model that adequately characterize the environment including the agents may be difficult. This specification, however, describes a technique of collecting robust training data by focusing on driving scenarios where the predicted future paths of the target agent in each pair of agents has a lower or equal precedence, i.e., right-of-way, at the overlapping region compared to that of the other agent. In addition, for the pair of agents involved in each model input, the input features include selected features that describe the two agents, respective predicted future paths for the two agents, interactions between the two agents, and, optionally, any additional agents (that are different from the agents in the pair) having predicted future paths that overlap with the predicted future path of the target agent. Specifically, the features are defined from the perspective of the target agent in each pair.

In practice, training the yielding prediction model on such training data effectively allows the models to learn to accurately predict the yielding likelihood of the target agent in each pair of agents having overlapping predicted future paths. Once being trained, the selected input features ensure high quality performance of the model on yielding predictions, which in turn improves overall safety of the vehicle when navigating through the real-world environment. Additionally, repeatedly applying the trained model to multiple agents in an environment having overlapping predicted future paths in a pairwise manner can allow the on-board system of the vehicle to identify, for each one of the multiple agents, exactly which one or more other agents the agent is yielding to. Compared to conventional approaches where only generic prediction about whether the target agent will yield to the traffic is available, such specific yielding predictions enable the on-board system to generate more accurate and timely planning decisions for the vehicle which are based specifically on any future yielding behaviors of the particular agent.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how an on-board system of a vehicle can predict how likely it is that a target agent in an environment will yield to another agent when the pair of agents are predicted to have overlapping future paths. The target agent can be any agent in the environment, including the vehicle itself. The other agent can be any agent that is different from the target agent in the environment. In other words, the on-board system of the vehicle can make predictions about whether other agents will yield to the vehicle, about whether one of two agents in the vicinity of the vehicle will yield to the other of the two agents, or both.

In particular, the on-board system implements a yielding prediction model to determine a likelihood score for a target agent in a pair of agents that have overlapping future paths. The likelihood score for the target agent characterizes an estimated likelihood that the target agent will yield to the other agent in the pair when entering an overlapping region. Yielding refers to, for example, the target agent allowing the other agent in the pair to enter the overlapping region first. In some cases, yielding involves the target agent slowing down its speed. The on-board system then generates planning decisions which plan a future trajectory of the vehicle based on respective predicted yielding likelihoods of the target agent in each pair of agents that have overlapping future paths. These features and other features are described in more detail below.

Figure 1:
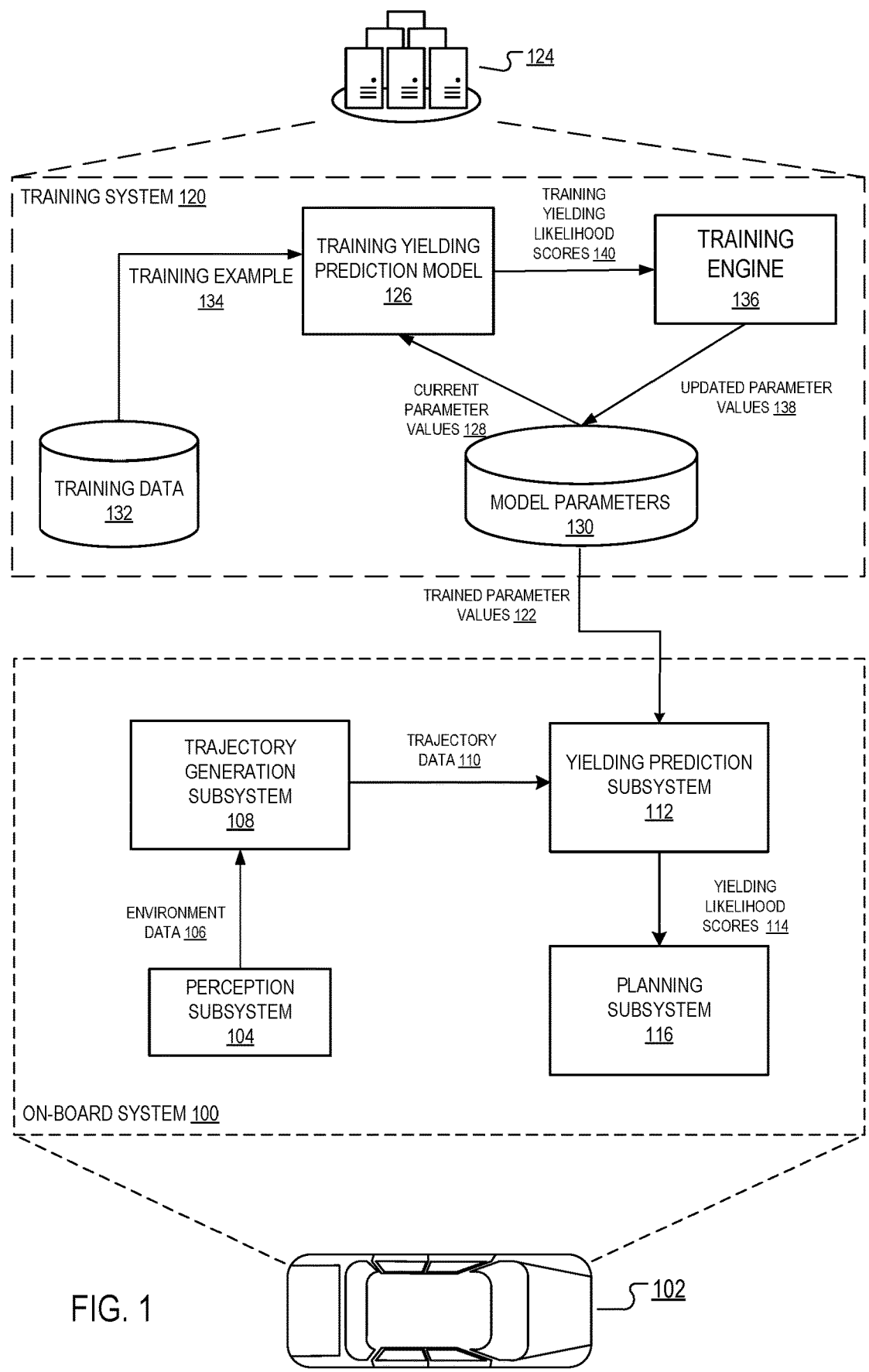
FIG. 1 is a block diagram of an example on-board system and an example training system.

FIG. 1 is a block diagram of an example on-board system 100 and an example training system 120.

The on-board system 100 is composed of hardware and software components, some or all of which are physically located on-board a vehicle 102. In some cases, the on-board system 100 can generate planning decisions which plan the future trajectory of the vehicle 102, present information to the driver of the vehicle 102 to assist the driver in operating the vehicle safely, or both. For example, in response to determining that the trajectory of another vehicle is likely to cross the trajectory of the vehicle 102, the on-board system 100 may generate planning decisions which adjust the future trajectory of the vehicle 102 to avoid a collision (e.g., by braking). As another example, in response to determining that the trajectory of another vehicle is likely to cross the trajectory of the vehicle 102, the on-board system 100 may present an alert message which prompts the driver of the vehicle 102 to adjust the trajectory of the vehicle 102 to avoid a collision.

Although the vehicle 102 in FIG. 1 is depicted as an automobile, and the examples in this specification are described with reference to automobiles, in general the vehicle 102 can be any kind of vehicle. For example, besides an automobile, the vehicle 102 can be a watercraft or an aircraft. Moreover, the on-board system 100 can include components additional to those depicted in FIG. 1 (e.g., a collision detection system or a navigation system).

The on-board system 100 includes a perception subsystem 104 which enables the on-board system 100 to "see" the environment in the vicinity of the vehicle 102. More specifically, the perception subsystem 104 includes one or more sensors, some of which are configured to receive reflections of electromagnetic radiation from the environment in the vicinity of the vehicle 102. For example, the perception subsystem 104 can include one or more laser sensors (e.g., LIDAR sensors) that are configured to detect reflections of laser light. As another example, the perception subsystem 104 can include one or more radar sensors that are configured to detect reflections of radio waves. As another example, the perception subsystem 104 can include one or more camera sensors that are configured to detect reflections of visible light.

The perception subsystem 104 repeatedly (i.e., at each of multiple time points) captures raw sensor data which can indicate the directions, intensities, and distances travelled by reflected radiation. For example, a sensor in the perception subsystem 104 can transmit one or more pulses of electromagnetic radiation in a particular direction and can measure the intensity of any reflections as well as the time that the reflection was received. A distance can be computed by determining the time which elapses between transmitting a pulse and receiving its reflection. Each sensor can continually sweep a particular space in angle, azimuth, or both. Sweeping in azimuth, for example, can allow a sensor to detect multiple objects along the same line of sight.

The on-board system 100 can use the raw sensor data that is continually generated by the perception subsystem 104 to continually generate environment data 106 that characterizes the latest state of an environment (i.e., the state of the environment at the current time point) in the vicinity of the vehicle 102. In particular, the environment data 106 includes data that describes any agents that are present in the vicinity of the vehicle 102. It should be noted that, for convenience, the agents in this specification will be described as largely relating to vehicles (e.g., sedans, trucks, or vans). In fact, the agents may be any participant in the environment including, for example, pedestrians, bicyclists, and motorcyclists.

The on-board system 100 can provide the environment data 106 to a trajectory generation subsystem 108. The trajectory generation subsystem 108 implements software that is configured to receive the environment data 106, data derived from the environment data 106, or both and repeatedly (i.e., at each of multiple time points) generate trajectory data 110 for some or all agents in the environment. In particular, for each of the multiple agents in the environment, the trajectory data 110 may include one or more predicted future trajectories for the agent. Each predicted future trajectory specifies a possible path, i.e., a predicted future path, in the environment along which the agent will travel within a certain period of time in the future, e.g., within the next 10 seconds after the current time point.

In some implementations, the on-board system 100 can provide the trajectory data 110 generated by the trajectory generation subsystem 108 to a planning subsystem 116.

When the planning system 116 receives trajectory data 110, the planning system 116 can use the trajectory data 110 to generate planning decisions which plan the future trajectory of the vehicle 102. The planning decisions generated by the planning system 116 can include, for example: yielding (e.g., to pedestrians), stopping (e.g., at a "Stop" sign), passing other vehicles, adjusting vehicle lane position to accommodate a bicyclist, slowing down in a school or construction zone, merging (e.g., onto a highway), and parking.

For example, the planning decisions generated by the planning subsystem 116 can be provided to a control subsystem (not shown in the figure) of the vehicle 102. The control subsystem of the vehicle can control some or all of the operations of the vehicle by implementing the planning decisions generated by the planning subsystem. For example, in response to receiving a planning decision to apply the brakes of the vehicle, the control subsystem of the vehicle 102 may transmit an electronic signal to a braking control unit of the vehicle. In response to receiving the electronic signal, the braking control unit can mechanically apply the brakes of the vehicle.

In some scenarios, especially where multiple agents are present in the environment, one or more pairs of agents may be predicted to travel along future paths that overlap at an overlapping region. In other words, a predicted future path of an agent in the pair overlaps with a predicted future path of another agent in the same pair. Such scenarios include, for example, when the trajectory data 110 includes data specifying that two agents are predicted to merge into the same lane on a highway or to enter an intersection that does not have a traffic light. In these scenarios, knowing which agent will enter the overlapping region prior to other agents enables the planning subsystem 116 to generate proper and timely planning decisions.

Therefore, the on-board system 100 also provides the planning subsystem 116 with data identifying, for a target agent in each pair of agents having overlapping future paths, how likely the target agent is to yield to the other agent in the pair. Typically, yielding refers to the target agent allowing the other agent to enter the overlapping region prior to the target agent. Yielding may also involve the target agent slowing down its speed while still following the predicted future path. In some implementations, the system 100 provides such data along with the trajectory data 110 to the planning subsystem 116. Alternatively, in some other implementations, the system 100 uses such data to modify the trajectory data 110 that was previously generated by the trajectory generation subsystem 108. In other words, the subsystem 108 can generate modified trajectory data 110 for each target agent to account for any possible yielding actions of the agent.

The onboard system 100 determines the likelihood that a target agent in a pair will yield to the other agent in the pair using a yielding prediction subsystem 112.

Specifically, the yielding prediction subsystem 112 is configured to generate a respective yielding likelihood score 114 for each predicted future path of a target agent using a yielding prediction model. The yielding prediction model can be configured, for example, as a neural network, a support vector machine (SVM) model, a decision forest model, including gradient boosting decision forest models, or as any other type of trainable machine learning model.

The yielding prediction model is configured to process, for each pair of agents having overlapping predicted future paths, a corresponding input that includes respective features for the target agent, the other agent, and, optionally, any additional agents (that are different from the agents in the pair) having predicted future paths that overlap with the predicted future path of the target agent and to generate a corresponding output which specifies a likelihood that the target agent will yield to the other agent when entering the overlapping region. Techniques for training the yielding prediction model will be described in more detail below.

In general, the respective features can include any appropriate features that describe both the target agent and the other agent. More specifically, in some implementations, the respective features include features that describe the agents and the respective predicted future paths for the agents. For example, the features can include the velocity of the agent (e.g., measured in miles per hour—mph), the acceleration or deceleration of the agent (e.g., measured in feet per second squared), the heading of the agent (e.g., measured in degrees), and the spatial position occupied by the agent in the environment. As another example, the features can include geometric characteristics (e.g., straightness, direction, and curvature) of the predicted future path for the agent.

In particular, the respective features that describe the other agent and the predicted future path for the other agent are obtained from the perspective of the target agent. That is, corresponding measures or characteristics specified by these features are defined relative to a given frame of reference that is adopted by the target agent. For example, if the velocity feature for a target agent has a positive value, then another agent that is traveling in an opposite direction of the target agent will be described as traveling with a negative velocity.

In some implementations, the respective features include pairwise features that describe interactions between the target agent and the other agent. For example, the pairwise features include respective future time points at which the agents are predicted to enter the overlapping region and the difference between the respective future time points. As another example, the pairwise features include required acceleration (or deceleration) of the target agent in order to pass ahead of (or yield to) the other agent.

In some implementations, the respective features include additional pairwise features that similarly describe interactions between the target agent and any different agents in the environment whose predicted future paths overlap with the predicted future path of the target agent.

After generating yielding likelihood scores 114, the onboard system 100 can determine, for each pair of agents having overlapping paths, whether a target agent in the pair will yield to the other agent when entering the overlapping region.

In some implementations, if the likelihood is greater than a predetermined threshold value, the on-board system 100 can modify the predicted future trajectory for the target agent in the environment to account for the target agent yielding to the other agent. For example, upon determining that the target agent will yield to another agent, the system can reduce the predicted speed of the target agent as the target agent continues to follow the predicted future path. Optionally, reducing the predicted speed involves predicting the target agent to come to a complete stop, i.e., at some point along the predicted future path and before entering the overlapping region.

The planning subsystem 116 then generates planning decisions based on the predicted future trajectories for one or more agents that have been respectively modified to account for any predicted yielding actions.

To allow the yielding prediction subsystem 112 to accurately predict yielding likelihoods, the training system 120 can determine trained parameter values 122 of the yielding prediction model included in the yielding prediction subsystem 112. The training system 120 is typically hosted within a data center 124, which can be a distributed computing system having hundreds or thousands of computers in one or more locations.

The training system 120 includes a training yielding prediction model 126 that is configured to process as input respective features for each pair of agents having overlapping predicted future paths to generate a corresponding output that specifies a likelihood score characterizing the likelihood of a target agent to yield to the other agent in the pair when entering the overlapping region. The training system 120 includes one or more computing devices having software or hardware modules that implement the operations of the training yielding prediction model 126. For example, if the training yielding prediction model 126 is a gradient boosting decision forest model, then the training system 120 includes one or more computing devices having software or hardware modules that implement the respective operations of each decision tree of the training gradient boosting decision forest model according to a structure of the training gradient boosting decision forest model. The training yielding prediction model 126 is generally the same model as the on-board yielding prediction model. For example, if the training yielding prediction model is a gradient boosting decision forest model, then it generally has the same number of decision trees and the same structure as the on-board gradient boosting decision forest model included in the yielding prediction subsystem 112.

The training yielding prediction model 126 can compute the operations of the training yielding prediction model 126 using current parameter values 128 of parameters stored in a collection of model parameters 130. Although illustrated as being logically separated, the model parameters 130 and the software or hardware modules performing the operations may actually be located on the same computing device or on the same memory device.

The training system 120 trains the training yielding prediction model 126 using a training data set 132 which includes multiple training examples 134. Typically, each training example 134 characterizes a corresponding pair of agents that have overlapping predicted future paths. In some implementations, each of the training examples 134 include (i) a plurality of input features for the target agent and the other agent at a corresponding time point, and (ii) a label specifying which agent actually did enter the overlapping region first at a future time point that is after the corresponding time point. Obtaining training examples and training the yielding prediction model will be described in more detail below.

After training is complete, the training system 120 can provide a set of trained parameter values 122 to the on-board system 100 for use by the yielding prediction subsystem 112 in accurately predicting possible yielding actions of the target agent in each pair of agents having overlapping predicted future paths. The training system 120 can provide the set of trained parameter values 122 by a wired or wireless connection to the on-board system 100.

Figure 2:
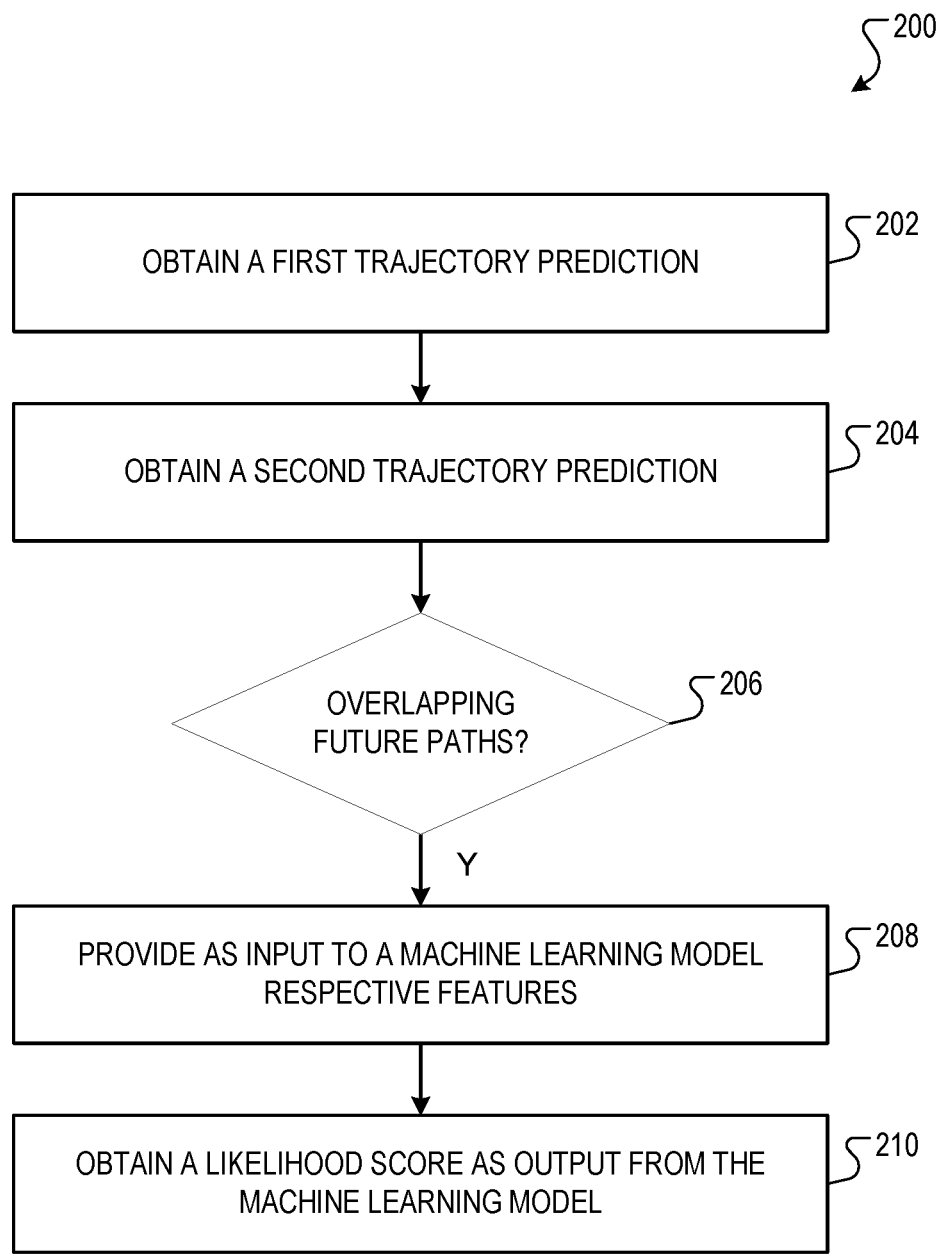
FIG. 2 is a flow diagram of an example process for predicting yielding likelihoods for a target agent.

FIG. 2 is a flow diagram of an example process 200 for predicting yielding likelihoods for a target agent. For convenience, the process 200 will be described as being performed by a system of one or more computers located in one or more locations. For example, the on-board system 100 of FIG. 1, appropriately programmed in accordance with this specification, can perform the process 200.

In some implementations, the system can receive a plurality of different predicted future paths for the target agent and can perform the process 200 for all of the different predicted future paths.

The system obtains a first trajectory prediction (202) specifying a predicted future path for a target agent in an environment that is typically in a vicinity of an autonomous vehicle, i.e., the vehicle 102 in FIG. 1. The target agent can be the autonomous vehicle itself, i.e., vehicle 102, or an agent that is different from the autonomous vehicle in the environment.

The system obtains a second trajectory prediction (204) specifying a predicted future path for another agent in the environment. The other agent is usually an agent that is different from the target agent in the environment.

Specifically, the system can obtain the trajectory predictions from the trajectory generation subsystem 108 that is included in the on-board system 100 of vehicle 102. The trajectory generation subsystem 108 implements software that is configured to generate trajectory data for the agents in the environment. In general, the generated trajectory data for each agent includes data specifying one or more predicted future paths for the agent.

Alternatively, in cases where the agent is the autonomous vehicle itself, the system can obtain the trajectory predictions from the planning subsystem 116 that is included in the on-board system 100 of vehicle 102. The planning subsystem 116 generates planning decisions which plan the future trajectory of the vehicle. That is, in this case, the predicted future path for the autonomous vehicle is the currently planned future path for the autonomous vehicle as generated by the planning subsystem.

The system determines whether the predicted future path for the target agent overlaps (206) with the predicted future path for the other agent at an overlapping region. For example, the system can make the determination based on whether the respective predicted future paths intersect each other. As another example, the system can make the determination based on whether the agents will overlap with each other when traveling along the respective predicted future paths.

If the determination result is negative, i.e., upon determining that the respective predicted future paths for the pair of agent do not overlap, the process 200 can return to either step 202 or step 204. That is, the system proceeds to obtain additional predicted future paths for either the target agent, the other agent, or any other different agents in the environment.

On the other hand, in response to a positive determination, the system provides as input to a machine learning model respective features (208) for the target agent, the other agent, and, optionally, any additional agents (that are different from the agents in the pair) having predicted future paths that overlap with the predicted future path of the target agent. The features may describe either the target agent, the other agent, or both. The features may also describe respective predicted future paths for the target agent and the other agent, either independently or relatively. Further, the features may describe respective pairwise interactions between the target agent and the other agent or the additional agents.

The machine learning model is configured to process the features in accordance with current model parameter values to predict whether the target agent will yield to the other agent when entering the overlapping region. In practice, the prediction is typically conditional on both agents continuing to follow (at least approximately) respective predicted future paths for the pair of agents.

For example, the machine learning model can generate likelihood scores that each range between zero and one, either inclusive or exclusive. In this example, a likelihood score that is close to one indicates that the target agent is likely to yield to the other agent if both agents continue to follow respective predicted future paths. Meanwhile, a likelihood score that is close to zero indicates that the target agent is unlikely to yield to the other agent if both agents continue to follow respective predicted future paths.

The system obtains the likelihood score as output from the machine learning model (210).

In certain situations, e.g., when the environment involves a complex urban scenario, a target agent may have a predicted future path that overlaps with respective predicted future paths for multiple other agents. In these situations, merely knowing how likely it is that the target agent will yield to each one of the group of multiple other agents is usually not enough. Advantageously, among the group of multiple other agents, identifying which one or more particular agents are the target agent most likely to yield to can further help the planning subsystem 116 onboard vehicle 102 to generate more timely and accurate planning decisions by better accounting for the impact of respective changes in future behaviors of the particular agents.

Therefore, in some implementations, the system can repeatedly perform the process 200 to obtain a plurality of outputs each specifying a respective likelihood that the target will yield to a corresponding other agent. Some or all of the other agents have predicted future paths that overlap with the predicted future path of the target agent.

Accordingly, the system identifies, from the plurality of other agents and based at least on the respective likelihood scores, one or more other agents that the target agent is yielding to. For example, the system can sort the plurality of other agents in descending order of corresponding likelihood scores and identify one or more others agent with top likelihood scores as the agents that the target agent will yield to. As another example, the system can identify one or more other agents with likelihoods that are above a predetermined threshold value as the agents that the target agent will yield to.

As a particular example, the system receives trajectory data which includes data specifying overlapping predicted future paths for three agents—the target agent that is entering a particular lane on a highway through an on-ramp and first and second other agents that are already traveling in the particular lane on the highway. In particular, the second other agent is vehicle 102 itself. The system processes the respective features for the three agents using the yielding prediction model and in accordance with the trained values of the model parameters to generate as output two likelihood scores—0.8 for the pair of agents consisting of the target agent and the first other agent, and 0.5 for the pair of agents consisting of the target agent and the vehicle 102. Upon receiving the likelihood scores, the system can determine that the target agent is more likely to yield to the first other agent rather than to vehicle 102 when entering the lane on the highway. Accordingly, the system generates a modified trajectory prediction for the target agent to account for the yielding largely to the first other agent. Once the modified trajectory prediction is generated, the system may in turn generate a corresponding planning decision to apply the brake of the vehicle 102 as a precautionary measure to prevent possible collision with the target agent.

Figure 3:
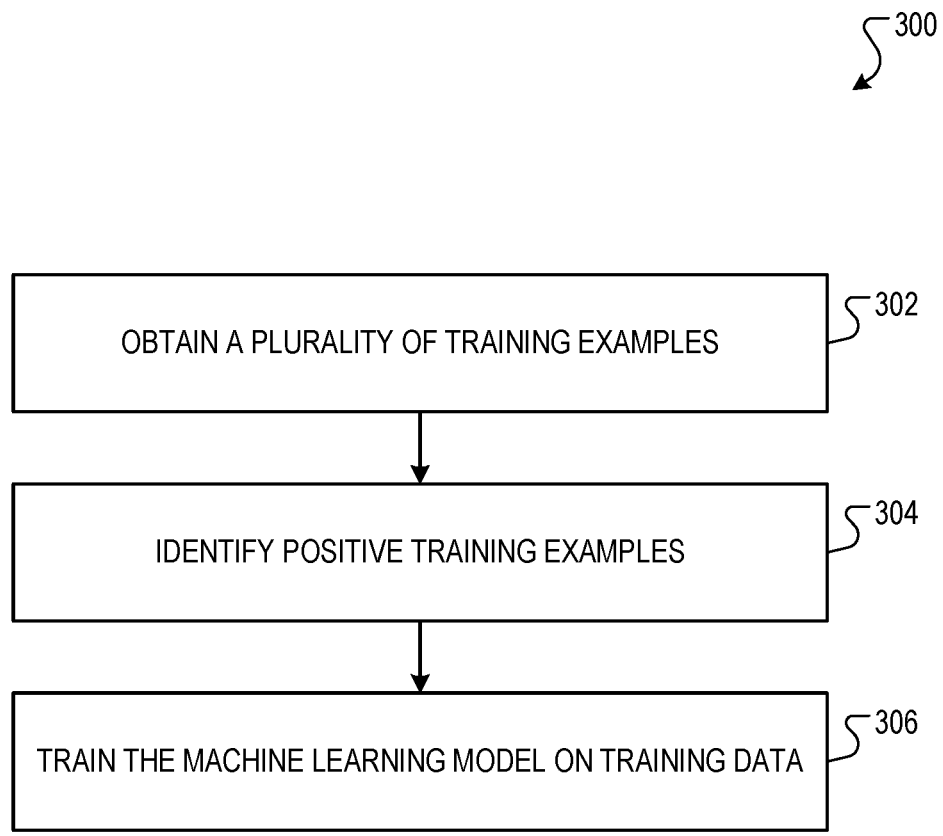
FIG. 3 is a flow diagram of an example process for training a yielding prediction model.

FIG. 3 is a flow diagram of an example process 300 for training a yielding prediction model. For convenience, the process 300 will be described as being performed by a system of one or more computers located in one or more locations. For example, a training system, e.g., the training system 120 of FIG. 1, appropriately programmed in accordance with this specification, can perform the process 300.

The system obtains a plurality of candidate training examples (302) that each correspond to a respective pair of agents including a target agent and another agent. Specifically, each candidate training example includes a plurality of features for the corresponding pair of agents, and, optionally, any additional agents (that are different from agents in the pair) whose predicted future paths overlap with that of the target agent. The features may describe either the target agent, the other agent, or both. The features may also describe respective predicted future paths for the target agent and the other agent, either independently or relatively. Further, the features may describe respective pairwise interactions between the target agent and the other agent or the additional agents.

The system can obtain the plurality of candidate training examples, at least partially, from real or simulated driving logs. A real driving log stores data that is continually generated by the on-board system 100 of the vehicle 102 based on processing raw sensor data that is generated by one or more sensors of the vehicle, as the vehicle navigates through real-world environments. The data stored in the log can be, for example, environment data or trajectory data. In particular, each environment data includes data describing the one or more agents at a corresponding time point. Each trajectory data includes data describing the predicted future paths of the one or more agents at the corresponding time point.

A simulated driving log stores simulated data. Simulated data is generated based on a software simulation of the environment. That is, the simulated data simulates data that would be generated by the on-board system 100 based on processing raw sensor data.

In some implementations, the system obtains candidate training examples from log data characterizing environments in which the predicted future path for the corresponding target agent has a lower or equal precedence at the overlapping region compared to the predicted future path for the corresponding other agent. A precedence of an agent at the overlapping region refers to the legal right of the agent to enter the overlapping region first, e.g., in accordance with the right-of-way rules defined by local driving laws and regulations. Specifically, in such implementations, each candidate training example includes respective features for a pair of agents among which the other agent has the right-of-way at the overlapping region. Focusing on these training examples avoids noisy training signals that originate from other training examples in which the target agent generates random or unlawful yielding actions. In general, more focused training objectives like this can lead to more accurate yielding likelihood prediction for the target agent and shortened model training time.

Figure 4:
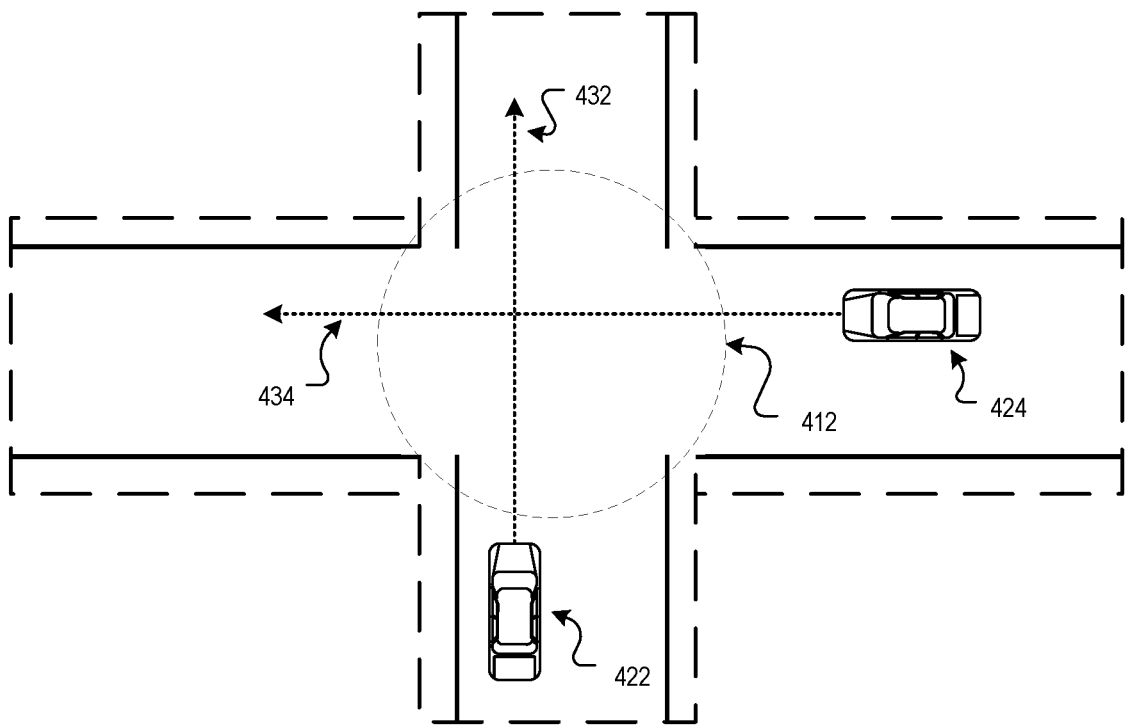
FIG. 4 is an illustration of an example environment in which two agents have overlapping future paths.
Figure 4:
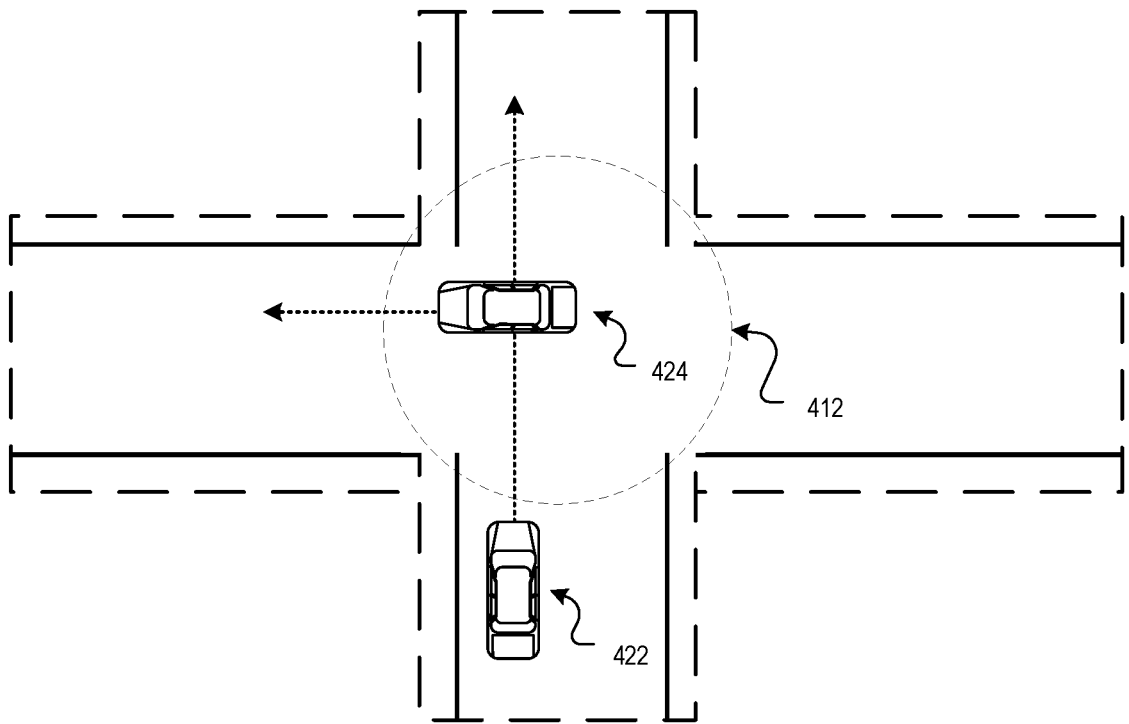

As a particular example, FIG. 4 illustrated a candidate training example. In the example of FIG. 4, the system obtains a candidate training example that includes a plurality of features for a target agent 422 and another agent 424 in an environment 406 at a corresponding time point, i.e., environment 406A. In particular, at the corresponding time point, the target agent 422 and the other agent 424 have respective predicted future paths 432 and 434 that overlap at an overlapping region 412 that corresponds to the intersection which both agents 422 and 424 are approaching.

The system identifies at least one of the plurality of candidate training examples as a positive training example (304). In particular, the system identifies as a positive training example each candidate training example for which (i) both agents followed (at least approximately) the respective predicted paths after the corresponding time point and at least until reaching the overlapping region and (ii) the other agent entered the overlapping region prior to the target agent.

The system can assign a positive label to each identified positive training example. For example, when the machine learning model is configured to generate training yielding likelihood scores that each range between zero and one, a positive label generally specifies the ground truth yielding likelihood score for the target agent to be a largest possible value within the range, e.g., one.

Referring back to the particular example depicted in FIG. 4, the system identifies the candidate training example as a positive training example because, as shown in environment 406B that characterizes the same environment 406 but at a future time point that is after the corresponding time point, (i) both agents followed the respective predicted future paths after the corresponding time point and (ii) the other agent 424 actually did enter the overlapping region prior to the target agent 422.

In some implementations, the system also identifies at least one of the plurality of candidate training examples as a negative training example. In particular, the system identifies as a negative training example each candidate training example for which (i) both agents followed (at least approximately) the respective predicted paths after the corresponding time point and at least until reaching the overlapping region and (ii) the target agent entered the overlapping region prior to the other agent. Similarly, the system can assign a negative label to each identified negative example.

In some implementations, in addition to assigning positive or negative labels, the system can also assign respective weights to the plurality of candidate training examples. The weights are generally associated with respective qualities (e.g., observability, detection range, generalizability, and the like) of the log data from which the candidate training examples are obtained. For example, the system can assign a higher weight to a training example in which both agents are consistently observable, and assign a lower weight to another training example in which one of the agents is occluded after some time point.

The system trains the machine learning model on training data (306).

In general, the training process involves repeatedly updating respective values of the model parameters to optimize an objective function which characterizes the performance of the model. In other words, to train the machine learning model, the system can repeatedly generate updated model parameter values to allow the model to output, for each candidate training example, a training yielding likelihood score for the target agent that match ground truth yielding likelihood score specified by the corresponding label.

In implementations where the system also assigns weights, candidate training examples that are assigned higher weights generally impact updates to model parameter values more than otherwise equivalent candidate training examples that are assigned lower weights. For example, the system can multiply a gradient of the objective function that is computed for each candidate training example by the weight assigned to the candidate training example before using the gradient to compute an update to the model parameter values, e.g., by applying an update rule to the computed gradient.

Specifically, as shown in FIG. 1, the training yielding prediction model 126 can process the input features from the training examples 134 to generate, for each training example 134, a corresponding output which specifies a training yielding likelihood score 140 of the target agent. A training engine 136 then repeatedly updates respective values of the model parameters to minimize the difference between the training yielding likelihood scores 140 and corresponding ground truth yielding likelihood scores that are specified by the labels. The training engine 136 can then update the collection of model parameters 130 using the updated model parameter values 138.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by an on-board system of a vehicle, the method comprising:
    obtaining, by the on-board system of the vehicle, a first trajectory prediction specifying a predicted future path for a target agent in a vicinity of the vehicle in an environment, the target agent being different from the vehicle;
    obtaining, by the on-board system of the vehicle, a second trajectory prediction specifying a predicted future path for another agent in the vicinity of the vehicle in the environment, the other agent being different from both the vehicle and the target agent;
    determining by the on-board system of the vehicle that, at an overlapping region in the environment, the predicted future path for the target agent overlaps with the predicted future path for the other agent; and
    in response:
        providing, by the on-board system of the vehicle, as input to a machine learning model respective features that describe the target agent and the other agent, wherein the machine learning model is implemented within the on-board system of the vehicle and is configured to predict a likelihood score representing a predicted likelihood that the target agent will yield to the other agent when entering the overlapping region, given that the target agent will follow the predicted future path for the target agent and that the other agent will follow the predicted future paths for the other agent; and
        obtaining, by the on-board system of the vehicle, the likelihood score as output from the machine learning model.

2. The method of claim 1, further comprising, if the likelihood score is greater than a predetermined threshold value:
    modifying the first trajectory prediction for the target agent in the environment to account for the target agent yielding to the other agent.

3. The method of claim 1, wherein the respective features for the target agent comprise (i) features that describe the target agent and (ii) features that describe the predicted future path for the target agent.

4. The method of claim 1, wherein the respective features for the other agent comprise (i) features that describe the other agent from a perspective of the target agent and (ii) features that describe the predicted future path for the other agent from the perspective of the target agent.

5. The method of claim 1, wherein the respective features for the target agent and the other agent comprise pairwise features that describe interactions between the target agent and the other agent.

6. The method of claim 1, further comprising:
    providing as input to the machine learning model respective features for the target agent and the vehicle in the environment, the vehicle having a planned future path generated by the on-board system of the vehicle that overlaps with the predicted future path of the target agent at a same or different overlapping region in the environment, wherein the respective features comprise pairwise features that describe interactions between the target agent and the vehicle; and
    obtaining as output of the machine learning model a likelihood score representing a predicted likelihood that the target agent will yield to the vehicle when entering the same or different overlapping region.

7. The method of claim 1, wherein the machine learning model is a gradient boosting decision forest model.

8. A method of training a machine learning model having a plurality of model parameters, the method comprising:
    generating training data for the machine learning model, wherein the machine learning model is configured to receive as input (i) a first plurality of features for a target agent in an environment including features that describe a predicted future path for the target agent and (ii) a second plurality of features for another agent in the environment including features that describe a predicted future path for the other agent, and to process the first plurality of features and the second plurality of features in accordance with the plurality of model parameters to generate an output that assigns a likelihood score to the target agent, the likelihood score representing a predicted likelihood that the target agent will yield to the other agent, given that the target agent will follow the predicted future path for the target agent and that the other agent will follow the predicted future path for the other agent, and wherein generating the training data comprisesi+g:
        obtaining a plurality of candidate training examples, wherein each candidate training example includes features for a corresponding target agent and a corresponding other agent at a corresponding time point, wherein at the corresponding time point the target agent and the other agent had respective predicted future paths that overlapped at an overlapping region; and
        identifying as a positive training example each candidate training example for which:
            both agents followed the respective predicted paths after the corresponding time point, and the other agent entered the overlapping region prior to the target agent; and training the machine learning model on the training data.

9. The method of claim 8, wherein generating training data for the machine learning model further comprises:
identifying as a negative training example each candidate training example for which:
both agents followed the respective predicted paths after the corresponding time point, and
the target agent entered the overlapping region prior to the other agent.

10. The method of claim 8, wherein obtaining the plurality of candidate training examples comprises:
determining, for each candidate training example, that the predicted future path for the corresponding target agent has a lower or equal precedence at the overlapping region compared to the predicted future path for the corresponding other agent.

11. An on-board system of a vehicle comprising:
one or more computers; and
one or more storage devices communicatively coupled to the one or more computers, wherein the one or more storage devices store instructions that, when executed by the one or more computers, cause the one or more computers to perform operations comprising:
obtaining, by the on-board system of the vehicle, a first trajectory prediction specifying a predicted future path for a target agent in a vicinity of the vehicle in an environment, the target agent being different from the vehicle;
obtaining, by the on-board system of the vehicle, a second trajectory prediction specifying a predicted future path for another agent in the vicinity of the vehicle in the environment, the other agent being different from both the vehicle and the target agent;
determining by the on-board system of the vehicle that, at an overlapping region in the environment, the predicted future path for the target agent overlaps with the predicted future path for the other agent; and
in response:
providing, by the on-board system of the vehicle, as input to a machine learning model respective features that describe the target agent and the other agent, wherein the machine learning model is implemented within the on-board system of the vehicle and is configured to predict a likelihood score representing a predicted likelihood that the target agent will yield to the other agent when entering the overlapping region, given that the target agent will follow the predicted future path for the target agent and that the other agent will follow the predicted future paths for the other agent; and
obtaining, by the on-board system of the vehicle, the likelihood score as output from the machine learning model.

12. The on-board system of claim 11, wherein the operations further comprise, if the likelihood score is greater than a predetermined threshold value:
modifying the first trajectory prediction for the target agent in the environment to account for the target agent yielding to the other agent.

13. The on-board system of claim 11, wherein the respective features for the target agent comprise (i) features that describe the target agent and (ii) features that describe the predicted future path for the target agent.

14. The on-board system of claim 11, wherein the respective features for the other agent comprise (i) features that describe the other agent from a perspective of the target agent and (ii) features that describe the predicted future path for the other agent from the perspective of the target agent.

15. The on-board system of claim 11, wherein the respective features for the target agent and the other agent comprise pairwise features that describe interactions between the target agent and the other agent.

16. One or more non-transitory computer storage media storing instructions that when executed by one or more computers cause the one or more computers to perform operations comprising:
obtaining, by an on-board system of the vehicle that comprises the one or more computers, a first trajectory prediction specifying a predicted future path for a target agent in a vicinity of the vehicle in an environment, the target agent being different from the vehicle;
obtaining, by the on-board system of the vehicle, a second trajectory prediction specifying a predicted future path for another agent in the vicinity of the vehicle in the environment, the other agent being different from both the vehicle and the target agent;
determining by the on-board system of the vehicle that, at an overlapping region in the environment, the predicted future path for the target agent overlaps with the predicted future path for the other agent; and
in response:
providing, by the on-board system of the vehicle, as input to a machine learning model respective features that describe the target agent and the other agent, wherein the machine learning model is implemented within the on-board system of the vehicle and is configured to predict a likelihood score representing a predicted likelihood that the target agent will yield to the other agent when entering the overlapping region, given that the target agent will follow the predicted future path for the target agent and that the other agent will follow the predicted future paths for the other agent; and
obtaining, by the on-board system of the vehicle, the likelihood score as output from the machine learning model.

17. The non-transitory computer storage media of claim 16, wherein the operations further comprise, if the likelihood score is greater than a predetermined threshold value:
modifying the first trajectory prediction for the target agent in the environment to account for the target agent yielding to the other agent.

18. The method of claim 6, further comprising:
determining, based at least on the likelihood scores, whether the target agent will yield to the other agent or yield to the vehicle.

19. The on-board system of claim 11, wherein the operations further comprise:
providing as input to the machine learning model respective features for the target agent and the vehicle in the environment, the vehicle having a planned future path generated by the on-board system of the vehicle that overlaps with the predicted future path of the target agent at a same or different overlapping region in the environment, wherein the respective features comprise pairwise features that describe interactions between the target agent and the vehicle; and
obtaining as output of the machine learning model a likelihood score representing a predicted likelihood that the target agent will yield to the vehicle when entering the same or different overlapping region.

20. The on-board system of claim 19, wherein the operations further comprise:
  determining, based at least on the likelihood scores, whether the target agent will yield to the other agent or yield to the vehicle.

21. The non-transitory computer storage media of claim 16, wherein the operations further comprise:
  providing as input to the machine learning model respective features for the target agent and the vehicle in the environment, the vehicle having a planned future path generated by the on-board system of the vehicle that overlaps with the predicted future path of the target agent at a same or different overlapping region in the environment, wherein the respective features comprise pairwise features that describe interactions between the target agent and the vehicle; and
  obtaining as output of the machine learning model a likelihood score representing a predicted likelihood that the target agent will yield to the vehicle when entering the same or different overlapping region.

22. The non-transitory computer storage media of claim 21, wherein the operations further comprise:
  determining, based at least on the likelihood scores, whether the target agent will yield to the other agent or yield to the vehicle.

* * * * *